Figure 1:
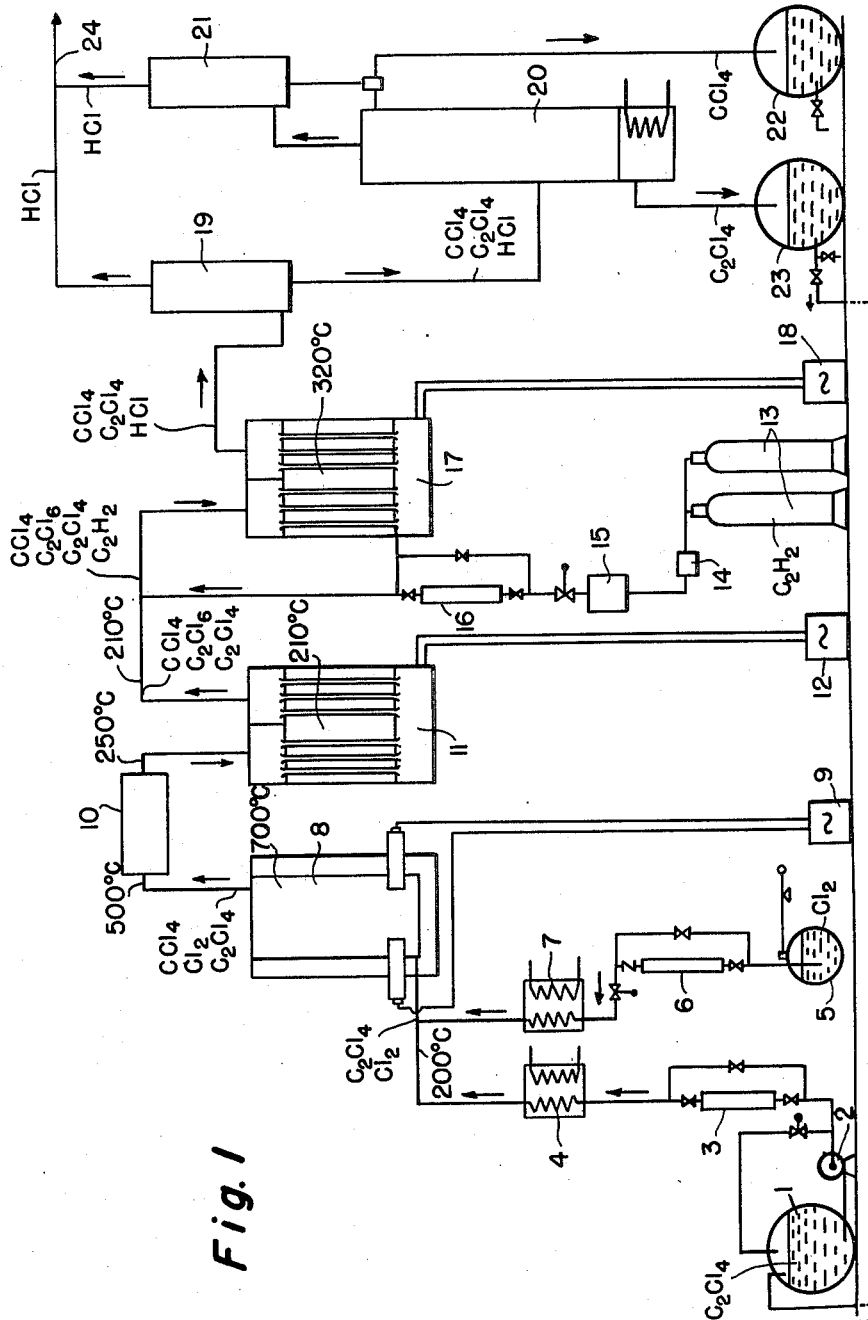

INVENTORS.
Robert Thermet
Ludovic Parvi

United States Patent Office 2,890,250
Patented June 9, 1959

2,890,250

MANUFACTURE OF TETRACHLOROETHYLENE AND CARBON TETRACHLORIDE

Robert Thermet, Grenoble, and Ludovic Parvi, Pont de Claix, France, assignors to Societe d'Electro-Chimie d'Electro-Metallurgie et des Acieries Electriques d'Ugine, Paris, France, a corporation of France Application February 5, 1958, Serial No. 713,439

Claims priority, application France January 30, 1953

6 Claims. (Cl. 260—654)

The present invention relates to the manufacture of halogenated derivatives of aliphatic hydrocarbons and, more particularly, to the manufacture of carbon tetrachloride and tetrachlorethylene, either simultaneously or individually, the relative proportions of carbon tetrachloride and of tetrachlorethylene produced being such that they can be controlled at will through a simple adjustment of the proportions of the raw materials which are used.

The present application is a continuation-in-part of application Serial No. 405,996, filed January 25, 1954, now abandoned, and application Serial No. 559,353, filed January 16, 1956, now abandoned.

It is known that it is possible to obtain carbon tetrachloride through the action of chlorine on tetrachlorethylene according to the balanced reaction:

$$2Cl_2 + C_2Cl_4 \rightleftharpoons 2CCl_4$$

at a temperature comprised between 700 and 800° C., without a catalyst, in the vapor phase. Under these conditions, a mixture of $CCl_4$, $C_2Cl_4$ and $Cl_2$ is obtained which must be cooled very rapidly in order to separate the $C_2Cl_4$ by condensation so that it will not react with the $Cl_2$ which would convert it into hexachlorethane $C_2Cl_6$. In order to obtain a good yield of $CCl_4$, it is necessary to use a large excess of chlorine and to recycle the $Cl_2$ and $C_2Cl_4$ which have not reacted.

It is known, on the other hand, that the action of acetylene $C_2H_2$ on hexachlorethane $C_2Cl_6$ (the latter being possibly obtained, as above mentioned, through the action of $Cl_2$ on $C_2Cl_4$ at a temperature lower than 700° C.) leads to the formation of $C_2Cl_4$. According to a known process, one proceeds in the following manner. Chlorine and tetrachlorethylene $C_2Cl_4$ are introduced into a preheater heated up to 200° C. Then the obtained gaseous mixture which contains, besides $C_2Cl_6$, a certain quantity of $C_2Cl_4$ and of $Cl_2$, which has not reacted, passes into a catalytic chamber at 200–400° C. which contains a catalyst and into which acetylene is introduced. A mixture of $C_2Cl_4$ and HCl leaves this chamber. The $C_2Cl_4$ is separated and part of it is recycled into the apparatus in order to react on chlorine.

But the known processes used for obtaining these reactions entail heat losses and a bad use of the apparatus owing to the obligation to recycle raw materials or intermediary products which have not reacted. Now, through a thorough study of the conditions of equilibrium and of the velocities of reaction between chlorine, the chlorinated derivatives of methane and of ethane and acetylene, applicants succeeded in limiting these drawbacks through judiciously adjusting the proportions of the reagents, the temperatures to which they are subjected and the sequence of the operations.

Said study and said results being taken into account, the method according to the invention makes it possible to simultaneously obtain carbon tetrachloride and tetrachlorethylene in predetermined proportions. Through a suitable adjustment of the starting products, it is possible to reduce to nil the proportion of tetrachlorethylene which is available for sale at the end of the process while obtaining only carbon tetrachloride and, likewise, through a very slight modification of the cycle of operation, it is possible to obtain the production of tetrachlorethylene alone.

Since the molecular quantities of carbon tetrachloride and tetrachlorethylene which it is desired to produce are $y$ moles and $ky$ moles respectively, the method according to a first embodiment of the invention fundamentally consists in causing $$\left(\frac{6k+5}{2}\right)y$$

moles of chlorine and at least $(3k+2)y$ moles of tetrachlorethylene to react on each other in the absence of any catalyst and at a temperature comprised between 600° and 800° C. for obtaining a mixture of carbon tetrachloride with free chlorine and tetrachlorethylene which have not reacted, the molecular quantity of tetrachlorethylene in said mixture being at least equal to the molecular quantity of free chlorine, heating said mixture at a temperature of 200 to 220° C. in the presence of a catalyst such as active carbon in order to combine almost the totality of the free chlorine with the corresponding quantity of tetrachlorethylene in the form of hexachlorethane which may also contain traces of chlorine, heating the product thus obtained with $$\left(\frac{2k+1}{2}\right)y$$

moles of acetylene to a temperature of 220 to 350° C. in the presence of a catalyst such as active carbon impregnated with cuprous chloride which gives rise to the formation of a mixture of carbon tetrachloride, tetrachlorethylene and hydrochloric acid, whereafter the constituents of the mixture are separated, for example, through a fractionated distillation, at least $(3k+2)y$ moles of the obtained tetrachlorethylene being recycled to the first stage of operation in order to react on a fresh quantity of chlorine.

The above mentioned molecular quantities may have to be corrected in order to take into account the losses and the variations of the quantities of reagents combined depending on the temperature, only experience making it possible to determine said corrections.

On the other hand, it may be seen that if $k$ is given a value zero or a value near zero and if one is thus led to recycle the totality of the produced tetrachlorethylene, only carbon tetrachloride and hydrochloric acid will be obtained, the latter forming a by-product of the manufacturing operations.

The reactions are effected in a succession of three chambers heated, for example, through electric means, a cooler being interposed between the first and the second chambers in order to lower the temperature of the gaseous mixture to the temperature which is desired for the reaction of formation of the hexachlorethane.

The reactions which occur in the various stages may be expressed by the following equations:

(1) $\qquad C_2Cl_4 + 2Cl_2 \rightleftharpoons 2CCl_4$ (2) $\qquad C_2Cl_4 + Cl_2 \rightleftharpoons C_2Cl_6$ (3) $\qquad 3C_2Cl_6 + C_2H_2 \rightleftharpoons 4C_2Cl_4 + 2HCl$ It is thus possible to express the method by the following equation:

$$\frac{(2k+1)y}{2} C_2H_2 + \frac{(6k+5)y}{2} Cl_2$$
$$= yCCl_4 + kyC_2Cl_4 + (2k+1)yHCl$$

with a quantity of $C_2Cl_4$ which is at least equal to $(3k+2)y$ which serves as a store and as an intermediary product.

An important characteristic feature of this process is the fact that the chlorine and the acetylene are never in contact in substantial quantities, the chlorine intervening only at the beginning and the acetylene only later in a gaseous mixture containing less than 1% of chlorine.

Another characteristic feature of the process is the exact use of the various conditions of equilibrium and the use of such initial proportions of $C_2Cl_4$ and $Cl_2$ that, on the one hand, the mixture entering the third stage contains only negligible quantities of free $Cl_2$ (less than 1%) and, on the other hand, the whole of the method yields, at will, a predetermined proportion of $C_2Cl_4$ and of $CCl_4$.

It is to be understood, on the other hand, that if the initial mixture of tetrachlorethylene and of chlorine is not subjected to the first step of the method, through heating at the temperature of 600 to 800° C., without any catalyst, but if it is immediately subjected to the second step, through heating to 200–220° C. in the presence of a catalyst, no carbon tetrachloride will form and only tetrachlorethylene will be collected at the end of the operation.

In accordance with a second embodiment of the present invention, the whole of the tetrachlorethylene at the input to the first stage is replaced by one or a number of other polychlorinated derivatives of hydrocarbons of $C_2$ or $C_3$, which are heated to a temperature which is determined as a function of the initial chlorinated hydrocarbon used, and the respective proportions of products to be obtained, the said temperature being comprised between about 300 and 700° C., with a quantity of chlorine which is such that, after the complete conversion of the chlorinated hydrocarbon used initially to tetrachlorethylene or to a mixture of tetrachlorethylene and carbon tetrachloride, the quantity of chlorine in excess, expressed in molecules, remains less than, or at the most equal to, that of the tetrachlorethylene formed. The reaction mixture thus obtained is then subjected in a second stage to a temperature of 200 to 220° C. in the presence of a catalyst such as activated carbon, in order to combine practically the whole of the excess chlorine with the corresponding quantity of tetrachlorethylene in the form of hexachlorethane, the mixture then being reacted in a third stage with a molecular quantity of acetylene equal to one-third of the quantity of hexachlorethane present, at a temperature of 220 to 350° C., in the presence of a catalyst such as activated carbon impregnated with cupric chloride, which gives rise to the formation of a mixture of tetrachlorethylene and hydrochloric acid or to a mixture of tetrachlorethylene, carbon tetrachloride and hydrochloric acid, after which the constituent parts of the mixture are separated, for example, by fractional condensation, none of the products obtained being recycled into the first stage of the operations and the chlorine introduced having been completely used.

The reaction of the initial chlorinated hydrocarbon or hydrocarbons in the first stage may be carried out either in the absence or in the presence of a catalyst such as activated carbon.

It is known, from numerous fragmentary items of information which exist in published matter, that the reaction temperature to be adopted in the first stage of the process depends on the nature of the starting compound as well as on the desired proportions of the carbon tetrachloride and the tetrachlorethylene.

Thus, in an article which appeared in Ind. Eng. Chem. 41, 803 (1949), McBee et al. prescribe a temperature of 480° C. for the chlorolysis of the polychloropropanes containing on the average 6 atoms of chlorine per mol. In the same way, if tetrachlorethane is heated with chlorine, there is obtained:

Below 500° C., tetrachlorethylene only, in accordance with the reaction:

(1a) $\quad C_2H_2Cl_4+Cl_2 \rightarrow C_2Cl_4+2HCl$

Above 500° C., a mixture of tetrachlorethylene and carbon tetrachloride is obtained. At 600° C., for example, the reaction will be as follows:

(1b) $\quad 4C_2H_2Cl_4+3Cl_2 \rightarrow 3C_2Cl_4+2CCl_4+8HCl$

In a general manner, it is known that:

(a) The compounds with $C_3$ split below 500° C., giving one molecule of $C_2Cl_4$ for one molecule of $CCl_4$; above 500° C., a part of the $C_2Cl_4$ formed is converted into $CCl_4$; finally, above 580° C., there is formed in addition a little hexachlorbenzene, the quantity of which becomes appreciable above 700° C.

(b) The compounds with $C_2$ give only tetrachlorethylene below 500° C.; above 500° C., as in the case of compounds with $C_3$, there is obtained a mixture of tetrachlorethylene and carbon tetrachloride; finally, above 580° C., there is formed in like manner, in addition, a little hexachlorbenzene, the quantity of which becomes appreciable above 700° C.

Now, after having given special study to the influence of an increase in temperature on the balance:

$$C_2Cl_4+2Cl_2 \rightleftharpoons 2CCl_4$$

and on the speed of obtaining this balance, it has been observed that when the temperature passes from 400 to 700° C., the proportion of $CCl_4$ which can be obtained passes through a maximum, while the speed of the reaction increases in a continuous manner. In the first stage of the process, therefore, the temperature, the time of contact and the quantity of chlorine added will be varied in order to obtain varied proportions of carbon tetrachloride and tetrachlorethylene.

If the method in accordance with the second embodiment of the present invention is applied to tetrachlorethane, it will thus be possible to obtain varied proportions of tetrachlorethylene and carbon tetrachloride.

By carrying out the first stage of the treatment below 500° C., the process will continue in accordance with the Reaction 1a in this first stage, and then following the Reactions 2 and 3 in the subsequent stages; there will be obtained only tetrachlorethylene.

By carrying out the first stage of the treatment above 500° C., the process will continue in accordance with the Reaction 1b in this first stage, and then in accordance with the Reactions 2 and 3 in the subsequent stages; there will be obtained at the same time tetrachlorethylene and carbon tetrachloride.

At about 500° C., the proportions of these two substances will be determined by the initial compound used. As and when the temperature is increased at the same time as the quantity of chlorine, it will be possible to obtain a higher proportion of carbon tetrachloride but from 650° C. upwards, corresponding to the maximum possible proportion of this latter substance, it will be necessary to reduce the time of contact.

Good conditions of putting the second embodiment of the present invention into effect are those under which a polychloropropane containing from 3 to 7 atoms of chlorine per molecule is used as the initial starting substance. Such polychloropropanes can be readily obtained, for example, by photo-chemical clorination of propane in the liquid phase.

In this case, the reaction which takes place in the first stage of the process, at a temperature of the order of 500° C., is as follows:

$$C_3H_{8-n}Cl_n+(8-n)Cl_2 \rightarrow C_2Cl_4+CCl_4+(8-n)HCl$$

If, as has been stated above in connection with tetrachlorethane, the temperature of treatment during the first stage is increased while increasing also the quantity of chlorine introduced at the start, the proportion of $CCl_4$ formed may be increased.

In the second embodiment of the invention, apart from the fact that it is possible in certain cases to operate the first stage of reaction at a lower temperature than in the first embodiment, the second embodiment has two essential advantages as compared with the first embodiment, namely, that on the one hand it is unnecessary to recycle the tetrachlorethylene formed and that, on the other hand, as in the case of the first embodiment, no chlorine remains in the third stage in which acetylene is present.

Even though the second embodiment does not enable such varied proportions of carbon tetrachloride and tetrachlorethylene to be obtained as with the first embodiment, it has however the advantage as compared with other known processes, as has been explained above, of permitting this proportion to be varied to an appreciable extent.

Figure 2:
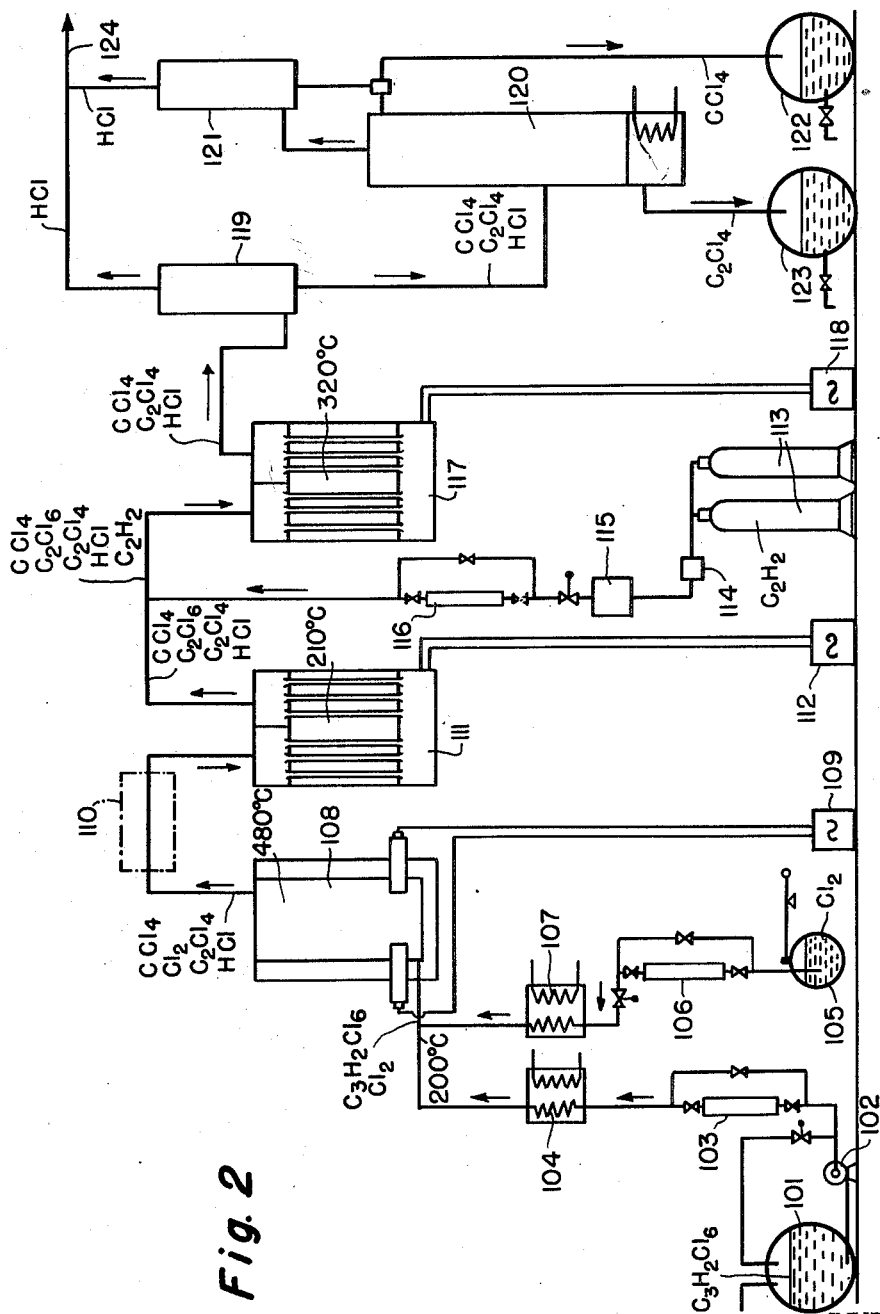

In the accompanying drawings which illustrate diagrammatically apparatus for practicing our methods, Figure 1 illustrates the first embodiment and Figure 2 the second embodiment.

FIRST EMBODIMENT

In describing the first embodiment, reference is made to Figure 1 and an example is chosen in which it is desired to produce only carbon tetrachloride, the totality of the tetrachlorethylene being recycled.

$C_2Cl_4$ pumped by a pump 2 into a feeding vat 1 at the rate of 117 mol/h. passes through a rotameter 3 for controlling the output and into an evaporator 4. Simultaneously, liquid $Cl_2$ coming from a cylinder 5 passes through a rotameter 6 for controlling the output at the rate of 135 mol/h. and into an evaporator 7. The $C_2Cl_4$ and the $Cl_2$ are brought at the same time into a chlorolysis furnace 8 which is heated and controlled at the temperature of 700° C. by heating electrodes controlled by a thermostat 9.

A mixture of 54 mol/h. of $CCl_4$, 81 mol/h. of $Cl_2$ and 90 mol/h. of $C_2Cl_4$ leaves the furnace 8. This mixture is brought into a cooler 10 in which the temperature decreases from 500 to 250° C. and then into a chlorination furnace 11 containing active carbon as a catalyst and heated and controlled in temperature at 210° C. by means of a device 12.

A mixture of 54 mol/h. of $CCl_4$, 81 mol/h. of $C_2Cl_6$ and 9 mol/h. of $C_2Cl_4$ leaves the furnace 11 at 210° C.

Moreover, $C_2H_2$ is brought from bottles 13 at the rate of 27 mol/h. through a pressure-reducing valve 14, a cleaner-washer 15 and a rotameter 16 for the control of the delivery into the piping leaving furnace 11 and where it meets the above mentioned mixture $CCl_4$—$C_2Cl_6$—$C_2Cl_4$. These react together in the chlorination furnace 17 which contains active carbon impregnated with cuprous chloride as a catalyst and which is heated and controlled in temperature at 320° C. through a device 18.

At the same time, 54 mol/h. of $CCl_4$, 117 mol/h. of $C_2Cl_4$ and 54 mol/h. of HCl leave furnace 17. These gases condense in condenser 19 whence the totality of the HCl, i.e., 54 mol/h., is brought to an absorber through piping 24.

The remainder, $CCl_4$, $C_2Cl_4$ and traces of HCl, is brought into a distillation column 20 whence the $C_2Cl_4$ is removed at the rate of 117 mol/h. and led to a receiving vat 23 and the $CCl_4$ at the rate of 54 mol/h. to a receiving vat 22. The $C_2Cl_4$ is returned to the feeding vat 1, the produced $CCl_4$ is collected and the traces of HCl join, through the reflux condenser 21, the absorber which is arranged at the end of piping 24.

The numerical examples mentioned hereunder relate to the application of the method according to the invention in three different cases.

*Example 1*

In the first case, the operation was conducted in order to produce only carbon tetrachloride.

The first furnace or chlorolysis furnace 8 which has a useful capacity of 20 litres was heated electrically to 700° C.

The chlorination chamber 11 containing 4 litres of active carbon was maintained at 210° C. by means of trichlorbenzene brought to a boiling point.

Finally, the chlorination chamber 17 which comprises seven tubes of 45 mm. diameter was maintained at 320° C. by means of a bath of molten salt.

The quantities of reacting and obtained bodies estimated in kg. per hour at the inlet and at the outlet of each stage are indicated in the following table:

|  | 1st Stage | | 2nd Stage | | 3rd Stage | | Produced |
|---|---|---|---|---|---|---|---|
|  | Inlet | Outlet | Inlet | Outlet | Inlet | Outlet |  |
| $Cl_2$ | 5.75 | 3.45 | 3.45 | 0 | 0 | 0 |  |
| $C_2Cl_4$ | 11.67 | 8.97 | 8.97 | 0.90 | 0.90 | 11.67 |  |
| $CCl_4$ |  | 5.00 | 5.00 | 5.00 | 5.00 | 5.00 | 5.00 |
| $C_2Cl_6$ |  |  |  | 11.52 | 11.52 | 0 |  |
| HCl |  |  |  |  | 0 | 1.18 | 1.18 |
| $C_2H_2$ |  |  |  |  | 0.43 | 0 |  |

*Example 2*

A second operation was conducted with a view to obtaining only tetrachlorethylene.

The chlorolysis furnace 8 was not heated and the chlorination chambers were brought to the same temperature as in Example 1.

The quantities of the reacting and obtained bodies are indicated in the following table:

|  | 1st Stage | | 2nd Stage | | 3rd Stage | | Produced |
|---|---|---|---|---|---|---|---|
|  | Inlet | Outlet | Inlet | Outlet | Inlet | Outlet |  |
| $Cl_2$ | 5.11 | 5.11 | 5.11 | 0 | 0 | 0 |  |
| $C_2Cl_4$ | 13.28 | 13.28 | 13.28 | 1.33 | 1.33 | 17.26 | 17.26− 13.28= 3.98 |
| $CCl_4$ |  |  |  |  |  | 0 |  |
| $C_2Cl_6$ |  |  |  | 17.06 | 17.06 | 0 |  |
| HCl |  |  |  |  |  | 1.75 | 1.75 |
| $C_2H_2$ |  |  |  | 0 | 0.62 | 0 |  |

*Example 3*

A third operation was conducted so as to obtain tetrachlorethylene and carbon tetrachloride, simultaneously.

The chlorolysis furnace was heated to 660° C. and the chlorination chambers 11 and 17 were brought to the same temperatures as in the Examples 1 and 2.

The quantities of the reacting and obtained bodies are indicated in the following table:

|  | 1st Stage | | 2nd Stage | | 3rd Stage | | Produced |
|---|---|---|---|---|---|---|---|
|  | Inlet | Outlet | Inlet | Outlet | Inlet | Outlet |  |
| $Cl_2$ | 5.43 | 4.28 | 4.28 | 0 | 0 | 0 |  |
| $C_2Cl_4$ | 12.47 | 11.12 | 11.12 | 1.11 | 1.11 | 14.46 | 14.26− 12.47= 1.79 |
| $CCl_4$ |  | 2.50 | 2.50 | 2.50 | 2.50 | 2.50 | 2.50 |
| $C_2Cl_6$ |  |  |  | 14.29 | 14.29 | 0 |  |
| HCl |  |  |  |  |  | 1.46 | 1.46 |
| $C_2H_2$ |  |  |  |  | 0.52 | 0 |  |

By converting the weight quantities given in this table into molecular quantities, it is seen that Example 3 involves the following reactions:

(Step 1)

(1) 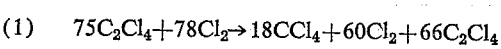
$75C_2Cl_4 + 78Cl_2 \rightarrow 18CCl_4 + 60Cl_2 + 66C_2Cl_4$ (Step 2)

(2) $18CCl_4 + 60Cl_2 + 66C_2Cl_4 \rightarrow$
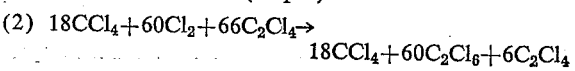
$18CCl_4 + 60C_2Cl_6 + 6C_2Cl_4$ (Step 3)

(3) $18CCl_4 + 60C_2Cl_6 + 6C_2Cl_4 + 20C_2H_2 \rightarrow$
$18CCl_4 + 86C_2Cl_4 + 40HCl$ The tetrachlorethylene used in the first embodiment of the invention may be partially replaced by another chlorinated derivative of ethylene or of ethane such as dichlorethylene, trichlorethylene, tetrachlorethane, pentachlorethane, hexachlorethane or even by chlorinated derivatives with a higher number of carbon atoms.

In the case of such a partial substitution, the above mentioned derivatives are rapidly converted into $C_2Cl_4$ by the combined action of chlorine and heat and the reacting system behaves in the same manner as the preceding mixture of $C_2Cl_4$ and $Cl_2$. However, it is then necessary to introduce a particular quantity of chlorine in order that the composition of the reaction mixture corresponds, before the formation of the $CCl_4$, to that which is indicated as being necessary for carrying out the first embodiment.

SECOND EMBODIMENT

In describing the second embodiment, reference is made to Figure 2 and an example is chosen starting from hexachloropropane $C_3H_2Cl_6$.

The hexachloropropane is stored in a supply tank 101 from which it is delivered by a pump 102 at the rate of 100 mols per hour and passes through a rotameter 103 for controlling the rate of flow into an evaporator 104. Simultaneously, chlorine supplied from a cylinder 105 passes through a flow-control rotameter 106 at the rate of 290 mols per hour into an evaporator 107. The $C_3H_2Cl_6$ and the chlorine are brought at the same time into a chlorolyzing oven 108 which is heated and regulated to a temperature of 480° C. by heating electrodes supplied from an apparatus 109.

From the oven 108 is delivered a mixture of 100 mols per hour of $CCl_4$, 90 mols per hour of chlorine, 100 mols per hour of $C_2Cl_4$, and 200 mols per hour of hydrochloric acid. This mixture is brought into a chlorination oven 111 containing activated carbon as a catalyst, and which is heated and regulated to a temperature of 210° C. by an apparatus 112.

From the oven 111 there is delivered a mixture at 210° C. of 100 mols per hour of carbon tetrachloride, 90 mols per hour of hexachlorethane, 10 mols per hour of tetrachlorethylene and 200 mols per hour of hydrochloric acid.

In addition, $C_2H_2$ is led in from the cylinders 113 at the rate of 30 mols per hour through a pressure-reducing valve 114, a purifier washer 115 and a flow-control rotameter 116 into the conduit passing out of the oven 111 where it meets the mixture $CCl_4$—$C_2Cl_6$—$C_2Cl_4$—HCl referred to above. These substances react together in an oven 117 containing activated carbon impregnated with cupric chloride as a catalyst, the oven being heated and regulated to a temperature of 320° C. by an apparatus 118.

From the oven 117, there are delivered at the same time 100 mols per hour of $CCl_4$, 130 mols per hour of $C_2Cl_4$ and 260 mols per hour of HCl. These gases are condensed in the condenser 119 from which almost the whole of the HCl, namely, 260 mols per hour, passes through the conduit 124 into an absorber.

The remainder, $CCl_4$, $C_2Cl_4$ and traces of HCl, is led into a distillation column 120 from which the $C_2Cl_4$ is evacuated at the rate of 130 mols per hour into a receiver tank 123 and the $CCl_4$ at the rate of 100 mols per hour into a receiving tank 122. The $C_2Cl_4$ and the $CCl_4$ produced are collected, the traces of HCl passing through the reflux condenser 121 to the absorber arranged at the extremity of the conduit 124.

In the case in which it is desired to increase the proportion of the carbon tetrachloride obtained and in which the oven 108 is in consequence to be heated to high temperatures, equal to or greater than 600° C., there is interposed between the oven 108 and the oven 111 a desuperheater shown in chain-dotted lines with the reference number 110.

Example 4

In accordance with the foregoing description, there was used as the initial or starting product hexachloropropane $C_3H_2Cl_6$.

The first oven or chlorolysis oven 108, having a useful capacity of 20 litres, was heated electrically to 480° C. The chlorination chamber 111, containing 4 litres of activated carbon, was maintained at 210° C. by means of trichlorbenzene brought to boiling point. Finally, the oven 117, comprising 7 tubes of 45 mm. in diameter, was maintained at 320° C. by a bath of molten salt. The quantities of reacting substances obtained, evaluated in kg. per hour, at the input and at the output of each stage are indicated in the following table:

|  | 1st Stage | | 2nd Stage | | 3rd Stage | |
|---|---|---|---|---|---|---|
|  | Input | Output | Input | Output | Input | Output |
| $Cl_2$ | 10.3 | 3.2 | 3.2 | 0 | 0 | 0 |
| $C_3H_2Cl_6$ | 12.55 | 0 | 0 | 0 | 0 | 0 |
| $C_2Cl_4$ | 0 | 8.3 | 8.3 | 0.83 | 0.83 | 10.80 |
| $CCl_4$ | 0 | 7.7 | 7.7 | 7.7 | 7.7 | 7.7 |
| $C_2Cl_6$ | 0 | 0 | 0 | 10.67 | 10.67 | 0 |
| HCl | 0 | 3.65 | 3.65 | 3.65 | 3.65 | 4.75 |
| $C_2H_2$ | 0 | 0 | 0 | 0 | 0.70 | 0 |

Example 5

Tetrachlorethane, $C_2H_2Cl_4$, was used as the starting substance.

(a) The features of the installation and also the heating conditions of the chlorination chamber 111 and of the oven 117 were the same as for Example 4, but the chlorolysis oven 108 was heated to 400° C.

The quantities of the reacting substances obtained, evaluated in kg. per hour, at the input and at the output of each stage, are indicated in the following table:

|  | 1st Stage | | 2nd Stage | | 3rd Stage | |
|---|---|---|---|---|---|---|
|  | Input | Output | Input | Output | Input | Output |
| $Cl_2$ | 9.05 | 4.26 | 4.26 | 0 | 0 | 0 |
| $C_2H_2Cl_4$ | 11.24 | 0 | 0 | 0 | 0 | 0 |
| $C_2Cl_4$ | 0 | 11.12 | 11.12 | 1.16 | 1.16 | 14.44 |
| $CCl_4$ | 0 | 0 | 0 | 0 | 0 | 0 |
| $C_2Cl_6$ | 0 | 0 | 0 | 14.22 | 14.22 | 0 |
| HCl | 0 | 4.91 | 4.91 | 4.91 | 4.91 | 6.37 |
| $C_2H_2$ | 0 | 0 | 0 | 0 | 0.52 | 0 |

In this case, there is no formation of $CCl_4$.

(b) Other things being equal, furthermore, as far as the installation and the respective temperatures of the chamber 111 and the oven 117 are concerned, the chlorolysis oven 108 was heated to 600° C. and the desuperheater 110 was put into use so as to obtain a temperature of 250° C. at the outlet of this latter apparatus. The quantities of reacting substances obtained, evaluated in kg. per hour, at the input and at the outlet of each stage are indicated in the following table:

|  | 1st Stage | | 2nd Stage | | 3rd Stage | |
|---|---|---|---|---|---|---|
|  | Input | Output | Input | Output | Input | Output |
| $Cl_2$ | 15.55 | 4.90 | 4.90 | 0 | 0 | 0 |
| $C_2H_2Cl_4$ | 16.80 | 0 | 0 | 0 | 0 | 0 |
| $C_2Cl_4$ | 0 | 12.45 | 12.45 | 1.0 | 1.0 | 16.27 |
| $CCl_4$ | 0 | 7.70 | 7.70 | 7.70 | 7.70 | 7.70 |
| $C_2Cl_6$ | 0 | 0 | 0 | 16.35 | 16.35 | 0 |
| HCl | 0 | 7.30 | 7.30 | 7.30 | 7.30 | 8.98 |
| $C_2H_2$ | 0 | 0 | 0 | 0.60 | 0.60 | 0 |

It will be seen that in this case tetrachlorethylene and carbon tetrachloride have been obtained in the respective proportions of 1.62 to 1 at the outlet of the first stage and of 2.1 to 1 over the whole process.

(c) Again under the same conditions, but with the chlorolysis oven 108 heated to 700° C., and increasing with respect to what is indicated in the preceding table, the proportion of chlorine introduced with respect to the $C_2H_2Cl_4$, the process was carried out in accordance with the following table:

|  | 1st Stage | | 2nd Stage | | 3rd Stage | |
|---|---|---|---|---|---|---|
|  | Input | Output | Input | Output | Input | Output |
| $Cl_2$ | 16.05 | 4.26 | 4.26 | 0 | 0 | 0 |
| $C_2H_2Cl_4$ | 16.80 | 0 | 0 | 0 | 0 | 0 |
| $C_2Cl_4$ | 0 | 11.12 | 11.12 | 1.16 | 1.16 | 14.44 |
| $CCl_4$ | 0 | 10.17 | 10.17 | 10.17 | 10.17 | 10.17 |
| $C_2Cl_6$ | 0 | 0 | 0 | 14.22 | 14.22 | 0 |
| HCl | 0 | 7.30 | 7.30 | 7.30 | 7.30 | 8.76 |
| $C_2H_2$ | 0 | 0 | 0 | 0 | 0.52 | 0 |

The tetrachlorethylene and the carbon tetrachloride have thus been obtained in the respective proportions of 1.09 to 1 at the output of the first stage and 1.4 to 1 over the whole process.

The acetylene used in the method according to either embodiment of the invention may be partially or totally substituted by dichlorethylene, trichlorethylene or tetrachlormethane. In the case of such a substitution, instead of the reaction:

$$3C_2Cl_6 + C_2H_2 \rightarrow 4C_2Cl_4 + 2HCl$$

under the same conditions, the following will be obtained:

$$2C_2Cl_6 + C_2H_2Cl_2 \rightarrow 3C_2Cl_4 + 2HCl$$
$$C_2Cl_6 + C_2HCl_3 \rightarrow 2C_2Cl_4 + HCl$$
$$C_2Cl_6 + C_2H_2Cl_4 \rightarrow 2C_2Cl_4 + 2HCl$$

These reactions are, moreover, only the intermediary reactions of the third stage in the method with acetylene.

The invention is not limited to the preferred embodiments but may be otherwise embodied or practiced within the scope of the following claims.

We claim:

1. A method of making carbon tetrachloride which comprises heating to a temperature of 600–800° C. a mixture of tetrachlorethylene and an amount of chlorine less than that required to react stoichiometrically with all of the tetrachorethylene to form carbon tetrachloride, thereby obtaining a mixture of carbon tetrachloride with free chlorine and tetrachlorethylene which have not reacted, the molecular quantity of tetrachlorethylene in said mixture being at least equal to the molecular quantity of free chlorine, heating said mixture at a temperature of 200–220° C. in the presence of a catalyst to combine as hexachlorethane substantially all of the free chlorine with the corresponding quantity of tetrachlorethylene, heating the resulting mixture at a temperature of 220–335° C. in the presence of a catalyst with acetylene to convert all of the hexachlorethane to tetrachlorethylene and hydrochloric acid, separating the constituents and recycling at least part of the tetrachlorethylene to the first reacting stage.

2. In a method of reacting acetylene with a mixture containing hexachlorethane, the improvement of making said mixture containing hexachlorethane which is substantially free of chlorine, which comprises heating to a temperature of 300–700° C., at least one polychlorinated derivative of a member selected from the class consisting of ethane and propane, and an excess of chlorine, whereby said polychlorinated derivative is converted to a gaseous mixture containing tetrachlorethylene, said excess of chlorine being such that after said conversion is completed there remains a molar quantity of unreacted free chlorine which is at most equal to the molar quantity of tetrachlorethylene which has been formed, and heating the obtained mixture at a temperature of 200–220° C. in the presence of a catalyst to combine as hexachlorethane substantially all of said unreacted free chlorine with the corresponding quantity of tetrachlorethylene.

3. A method according to claim 2, wherein said polychlorinated derivative and said excess of chlorine are heated in the presence of a catalyst.

4. In a method of reacting acetylene with a mixture containing hexachlorethane, the improvement of making said mixture containing hexachlorethane which is substantially free of chlorine, which comprises heating to a temperature of about 480° C. a polychloropropane having a molecule containing from 3 to 7 chlorine atoms, and an excess of chlorine, whereby said polychloropropane is converted to a gaseous mixture containing tetrachlorethylene and carbon tetrachloride, said excess of chlorine being such that after said conversion is completed there remains a molar quantity of unreacted free chlorine which is at most equal to the molar quantity of tetrachorethylene which has been formed, and heating the obtained mixture at a temperature of 200–220° C. in the presence of a catalyst to combine as hexachlorethane substantially all of said unreacted free chlorine with the corresponding quantity of tetrachlorethylene.

5. In a method of reacting acetylene with a mixture containing hexachlorethane, the improvement of making said mixture containing hexachlorethane which is substantially free of chlorine, which comprises heating to a temperature of about 480° C., tetrachlorethane and an excess of chlorine, whereby said tetrachlorethane is converted to a gaseous mixture containing tetrachlorethylene, said excess of chlorine being such that after said conversion is completed there remains a molar quantity of unreacted free chlorine which is at most equal to the molar quantity of tetrachlorethylene which has been formed, and heating the obtained mixture at a temperature of 200–220° C. in the presence of a catalyst to combine as hexachlorethane substantially all of said unreacted free chlorine with the corresponding quantity of tetrachlorethylene.

6. In a method of reacting acetylene with a mixture containing hexachlorethane, the improvement of making said mixture containing hexachlorethane which is substantially free of chlorine, which comprises heating to a temperature of 600–700° C., tetrachlorethane and an excess of chlorine, whereby said tetrachlorethane is converted to a gaseous mixture containing tetrachlorethylene and carbon tetrachloride, said excess of chlorine being such that after said conversion is completed there remains a molar quantity of unreacted free chlorine which is at most equal to the molar quantity of tetrachlorethylene which has been formed, and heating the obtained mixture at a temperature of 200–220° C. in the presence of a catalyst to combine as hexachlorethane substantially all of said unreacted free chlorine with the corresponding quantity of tetrachlorethylene.

References Cited in the file of this patent

UNITED STATES PATENTS

| 2,139,219 | Basel et al. | Dec. 6, 1938 |
| 2,178,622 | Basel et al. | Nov. 7, 1939 |
| 2,442,324 | Heitz et al. | May 25, 1948 |
| 2,547,139 | Randall | Apr. 3, 1951 |

FOREIGN PATENTS

| 663,364 | Great Britain | Dec. 19, 1951 |